United States Patent

Bayer

[11] Patent Number: 6,059,381
[45] Date of Patent: May 9, 2000

[54] ABS PUMP CONNECTOR

[75] Inventor: Michael H. Bayer, White Lake, Mich.

[73] Assignee: ITT Manufacturing Enterprises, Inc., Wilmington, Del.

[21] Appl. No.: 08/994,900

[22] Filed: Dec. 19, 1997

[51] Int. Cl.[7] ........................................................ B60T 8/34
[52] U.S. Cl. ................................ 303/119.3; 303/116.4; 303/DIG. 10
[58] Field of Search ..................... 303/116.4, 119.3, 303/113.1, DIG. 10

[56] References Cited

U.S. PATENT DOCUMENTS

| | | |
|---|---|---|
| 3,524,108 | 8/1970 | English . |
| 3,568,001 | 3/1971 | Straus . |
| 3,820,061 | 6/1974 | Holden . |
| 4,217,024 | 8/1980 | Aldridge et al. . |
| 4,392,181 | 7/1983 | Jabben . |
| 4,842,525 | 6/1989 | Galloway et al. . |
| 4,952,158 | 8/1990 | Nakagawa . |
| 5,022,717 | 6/1991 | Heibel et al. . |
| 5,040,853 | 8/1991 | Burgdorf et al. . |
| 5,055,073 | 10/1991 | Yamada et al. . |
| 5,137,455 | 8/1992 | Moerbe et al. . |
| 5,288,141 | 2/1994 | Isshiki et al. . |
| 5,407,260 | 4/1995 | Isshiki et al. . |
| 5,449,226 | 9/1995 | Fujita et al. . |
| 5,452,948 | 9/1995 | Cooper et al. . |
| 5,466,055 | 11/1995 | Schmitt et al. . |
| 5,549,344 | 8/1996 | Nishijima et al. . |

FOREIGN PATENT DOCUMENTS 105877  5/1991  Japan .

*Primary Examiner*—Matthew C. Graham
*Attorney, Agent, or Firm*—Rader, Fishman & Grauer PLLC

[57] ABSTRACT

A connector is disclosed for providing power to a pump from a circuit in an ABS braking unit. The electrical connector includes a generally cylindrical housing having first and second ends and a length corresponding to the perpendicular distance between the circuit and the pump. In one embodiment, the first end includes a plurality of flexible terminals mounted therein and electrically connected to the second end. The terminals are adapted to extend through and resiliently radially engage a corresponding plurality of contact passages mounted on the circuit for transmitting power to the second end. In a second embodiment, the second end of the connector also includes a plurality of flexible terminals resiliently mounted therein and adapted to engage a corresponding plurality of contact passages mounted on the pump for receiving power transmitted from the first end.

14 Claims, 4 Drawing Sheets

6,059,381

ABS PUMP CONNECTOR

CROSS-REFERENCE TO RELATED APPLICATION

This invention is related in certain respects to an application identified as attorney docket no. ATUS 4508 entitled "ABS PUMP CONNECTOR", assigned to the assignee of the present application by inventors C. Walker and M. Bayer and filed on even date herewith.

FIELD OF THE INVENTION

The present invention relates to an internal pump connector for use in a system such as an anti-lock braking system (ABS) on an automobile. More particularly, the invention relates to a removable connector for providing power to an ABS pump from a circuit of an electronic control unit during ABS utilization.

BACKGROUND OF THE INVENTION

Modem anti-lock braking system (ABS) control units are constructed to minimize weight and space requirements of the unit. Current ABS units include three major parts: an electronic control unit; a hydraulic control unit; and an ABS pump. Typically, the ABS pump is spaced away from the electronic control unit by the hydraulic control unit. In order for the electronic control unit to supply power to the ABS pump during system activation, the pump must be electrically connected to a circuit within the electronic control unit. Past designs have used cables which are located exterior of the hydraulic control unit to electrically connect between pump and circuit. Electrical connections exterior of the hydraulic control unit are subjected to severe environmental conditions which may lead to degradation of the electrical connection and system performance. These cables may also be inadvertently disconnected due to jarring or vibration. Known designs also use electrical connections between the circuit and ABS pump which extend perpendicular from the circuit of the electronic control unit through an aperture in the hydraulic control unit to the pump. These electrical connections internal to the hydraulic control unit are fastened or fixed to the printed circuit through a soldering process at the time the electronic control unit is manufactured. The connection fixed to the circuit of the electronic control unit must therefore be adapted to pass through a hydraulic control unit and to establish an adequate connection to the ABS pump when the ABS system is assembled.

In current practice, the electronic control unit, the hydraulic control unit and the ABS pump are manufactured by different suppliers, and are assembled together at another location. Current electronic control unit designs require that any fixed electrical connection be soldered to the printed circuit of the electronic control unit, after which the fixed connection is sealed from the exterior environment. As a result, the pump electrical connector is attached to the printed circuit at the time the electronic control unit is assembled, before the electronic control unit is shipped to a final location for assembly into an ABS unit. Because fixed electrical connectors protrude perpendicularly from the electronic control unit, shipping precautions dictate the use of extra packaging space for shipping electronic control units to assembly points to prevent damage to the electronic control unit. Nevertheless, shipping and handling damage to the connector extending perpendicularly from the electronic control unit housing frequently occurs. Moreover, fixing and sealing the pump electrical connector increases the complexity of the electronic control unit manufacture process. In particular, the connector first must be soldered or otherwise fixed to the printed circuit during manufacture of the electronic control unit. Because power requirements of the ABS pump are large, the connector must be capable of transmitting the necessary power. As a result, the electrical contact between the printed circuit and the electrical connector may be relatively large and secure. In particular, soldering integrity between the printed circuit and the connector becomes very complex as the area of the connection increases, requiring increased heat and manufacturing attention in order to achieve a robust electrical connection. Also, once the connector is fixedly attached to the printed circuit, the attachment must be sealed from external environmental conditions. Typically, after the electrical connector is attached to the printed circuit, a seal is molded in place about the electrical connector which forms a seal between the connector and the housing of the electronic control unit. Molding this seal requires an additional manufacturing step, the integrity of which must be monitored closely to prevent unit failure during service lifetime.

Current designs of electrical connectors between ABS pump and electronic control units also limit serviceability of the ABS unit. Because the electrical connection is soldered to a printed circuit and then molded in place, the electrical connector is not a replaceable part. Should the electrical connection ever fail, due to environmental conditions or manufacturing defects, the entire electronic control unit would have to be replaced rather than simply replacing the electrical connector.

SUMMARY OF THE INVENTION

The present invention is directed to an anti-lock braking system of the type having an electronic control unit with a printed circuit which provides power to a pump, where the pump is separated from the electronic control unit by a hydraulic control unit. A connector is disclosed for providing power to the pump from the printed circuit. The electrical connector includes a generally cylindrical housing having first and second ends and a length corresponding to the perpendicular distance between the printed circuit and the pump. In one embodiment, the first end includes one or more flexible terminals mounted in the first end and electrically connected to the second end. Each terminal is adapted to extend at least partially through a corresponding contact passage defined by the printed circuit for transmitting power to the second end. In a second embodiment, the second end of the connector also includes one or more flexible terminals mounted in the second end with each adapted to extend at least partially through a corresponding contact passage defined by the pump for receiving power transmitted from the first end.

The removable connector of the present invention overcomes disadvantages of conventional ABS pump electrical connections. The electronic control unit need not be fabricated with a permanently attached connector for the pump soldered to the printed circuit. As a result, packaging space for shipping is minimized, as is the possibility for damage during shipping and handling to the connector extension. The electrical connector seal may be built into the generally cylindrical housing of connector of the present invention, thereby removing a molding and sealing step from the manufacture of the electronic control unit. The present inventive connector is also not soldered to the printed circuit of the electronic control unit, removing the possibility for poor electrical connection or failure of the electrical connection to the printed circuit due to environmental conditions or shock damage to the connector during shipping or installation. Serviceability of the electronic control unit is also enhanced through the use of a detachable or removable internal connector to the pump.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
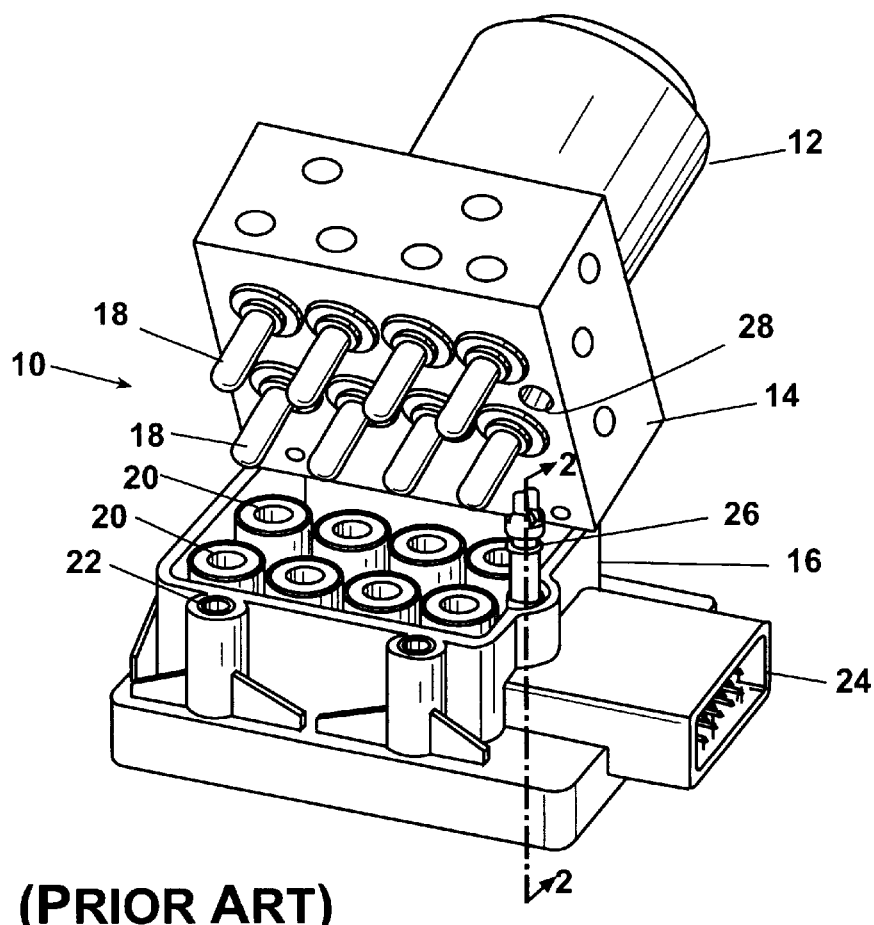
FIG. 1, is a view of a prior art ABS unit with an electronic control unit shown partially removed from a hydraulic control unit and a pump to depict a prior art electrical connector between a printed circuit and the ABS pump.

FIG. 1 displays a prior art electronically controlled hydraulic unit 10 which is intended for use in an automobile anti-lock braking system (ABS). As seen in FIG. 1, pump 12 is attached to hydraulic control unit 14, which is shown partially removed from electronic control unit 16. Hydraulic control unit 14 includes a plurality of valve actuators 18 which are adapted to be received within solenoid coils 20 of electronic control unit 16. Bosses 22 utilize conventional fastening members to attach the hydraulic assembly 10 into position on a host vehicle. An input/output connector 24 is located on the exterior of the electronic control unit 16 to provide for the input and output of both electrical power and signal currents to unit 10. A second electrical connector 26 extending generally perpendicularly from electronic control unit 16 forms a connection between electronic control unit 16 and pump 12 through aperture 28 in hydraulic control unit 14 to deliver power to the hydraulic pump 12.

Figure 2:
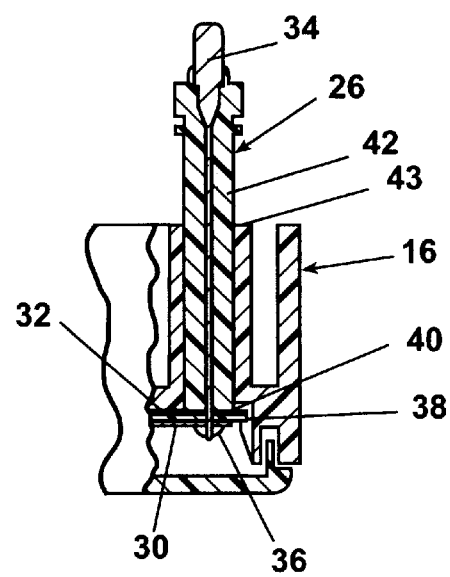
FIG. 2, is a cross-sectional view of a prior art pump connector as taken along lines 2—2 of FIG. 1.

The prior art assembly of connector 26 is further illustrated with reference to FIG. 2. Typically a printed or etched circuit 30 is mounted beneath solenoid coils 20 (not shown) within electronic control unit 16. Coils 20 are connected to printed circuit 30 to provide an electrical current to coils 20 which in turn induces a valve located with an actuator 18 to move between a seated and an unseated position. Printed circuit 30 is strengthened by being attached to a composite resin backing 38. The strength of printed circuit 30 is further enhanced through the addition of an aluminum backing plate 32, which also acts to dissipate waste heat. Prior art connector 26 includes at least one blade style terminal 34, and is long enough to reach from printed circuit 30 to the underside of pump 12. A first end 40 of blade style terminal 34 is attached directly to circuit 30, usually with solder 36. Prior to attaching first end 40 to printed circuit 30, a hole is drilled in both aluminum plate 32 and composite resin backing 38 to clear the way for first end 40 to be in contact with a solder pad (not shown) on printed circuit 30. Because of the size of first end 40 and of the heat capacity of terminals 34 in general, it is difficult to achieve a high integrity solder 36 because of the heat requirements necessary to heat both first end 40 and printed circuit 30 to a requisite temperature such that solder 36 adheres to circuit 30. After first end 40 is soldered to printed circuit 30, a seal 42 is injection molded about terminals 34 to prevent external environmental conditions from impacting or affecting the performance of circuit 30 and connector 26. Moreover, care must be taken with molded seal 42 at neck 43 of electronic control unit 16 where connector 26 emerges from the top of electronic control unit 16. If molded seal 42 does not completely seal at neck 43, then circuit 30 may be exposed to environmental elements which may lead to premature degradation of solder 36 at circuit 30. After seal 42 is molded about terminals 34, connector 26 is fixed in position and perpendicularly projects a distance above the top of electronic control unit 16 generally equal to the thickness of hydraulic control unit 14. There is thus potential for damage to connector 26 when shipping the finished electronic control unit 16 to an assembly location where it is assembled to hydraulic control unit 14 and a pump 12.

Figure 3:
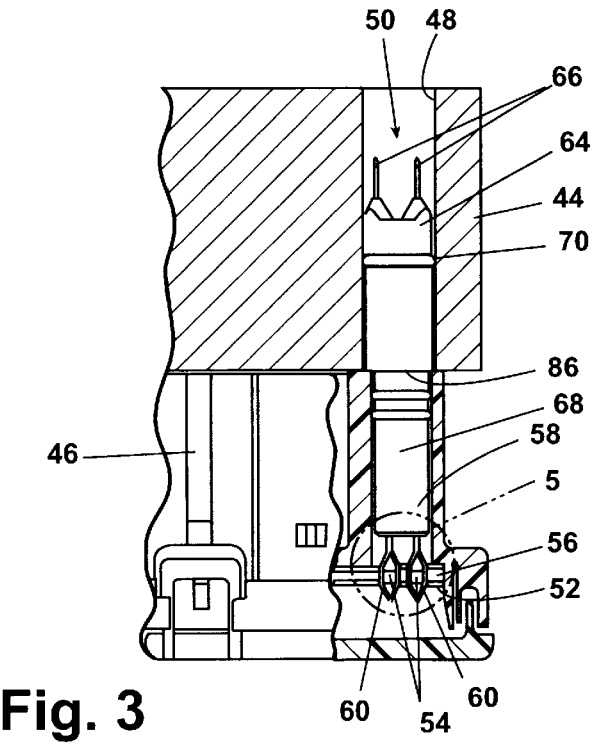
FIG. 3, is a relief view of a first embodiment of an electrical connector of the present invention in application with the ABS unit in cross-section.

To address the shortcomings of the prior art, a first embodiment of the present invention is illustrated with reference to FIG. 3. In FIG. 3, a hydraulic control unit 44 is shown adjacent to an electronic control unit 46 in an assembled position. An aperture 48 passes through hydraulic control unit 44. A connector 50 passes through aperture 48 and makes contact with a printed circuit 52 via contact passages 54 which extend through a composite resin backing 56 and communicate with etched or printed circuit 52. In the first embodiment, a first end 58 of connector 50 includes a plurality of flexible terminals 60. Terminals 60 are resiliently mounted in the first end 58, and are electrically connected via conductive busses 62 (see FIG. 4) to a second end 64 of connector 50. Second end 64 includes blade style terminals 66 which are adapted to connect to a corresponding connector on the bottom of an associated pump (not shown). Flexible terminals 60, busses 62 and blade style terminals 66 are all encased within a generally cylindrical connector housing 68 which is sized to provide a seal between printed circuit 52 and aperture 48. Furthermore, an O-Ring 70 is located adjacent second end 64 to further improve the seal between aperture 48 and printed circuit 52.

Contact between first end 58 of connector 50 and contact passages 54 is further described with reference to FIGS. 6 and 7. As described previously, a circuit 52 is mounted upon a composite resin backing 56. The side of composite resin backing 56 opposite from the circuit 52 has an aluminum plate 72 laid thereover as a structural support and thermal sink. Plate 72 has an opening 74 therethrough configured and positioned concentrically with aperture 48 whereby contact passages 54 are exposed thereto.

Figure 6:
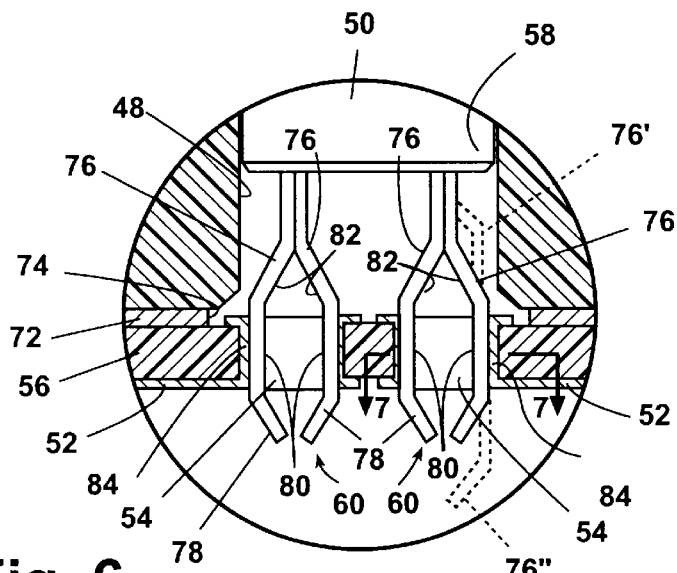
FIG. 6, is an enlarged view of circle 5 of FIG. 3, showing the connector in an engaged position.
Figure 7:
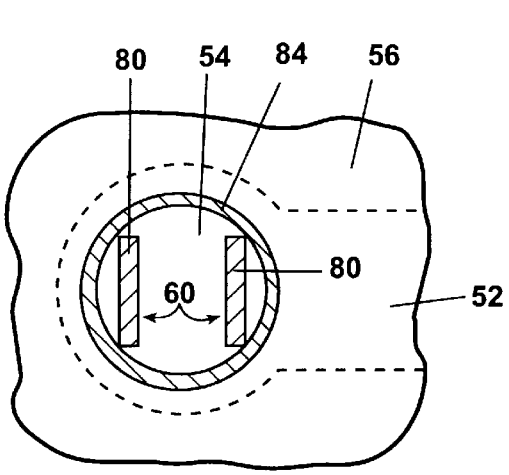
FIG. 7, is a cross-sectional view taken on lines VII—VII of FIG. 6, showing a preferred terminal configuration.
Figure 9:
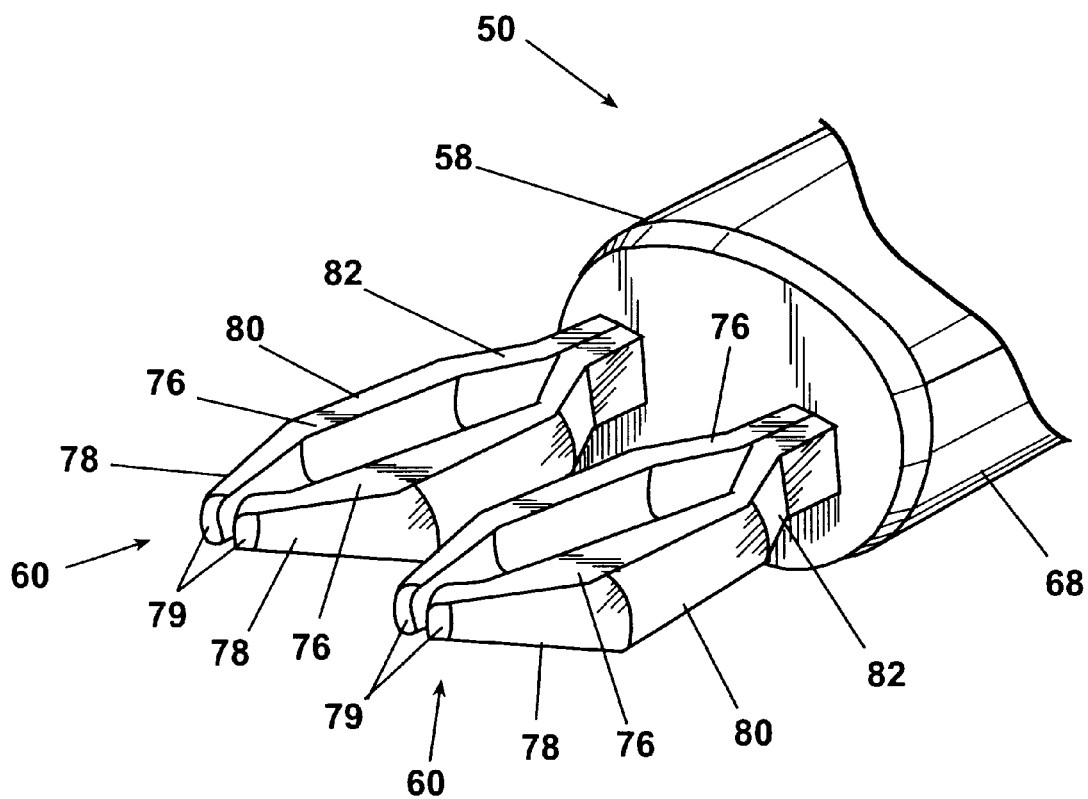
FIG. 9, is a broken perspective view of the connector of FIG. 4 on an enlarged scale illustrating the structural details of the flexible terminals.

As best illustrated in FIGS. 6 and 9, each flexible terminal 60 is bifurcated to include a mirror image pair of elongated tangs 76. Each tang 76 includes a tapered leading portion 78, a main contact portion 80 and a tapered trailing portion 82. The tangs 76 extend from first end 58 of connector 50 as flexible cantilevers and are constructed of electrically conductive material in-circuit with busses 62 (refer FIG. 4) as described hereinabove. Each pair of tangs 76 is formed in a generally wish bone configuration. The ends of each leading portion 78 is circumferentially tapered to form a chisel-like tip 79 which cooperates to locate the leading end of portions 78 within their respective passages 54 and self-center each terminal 60 therein during the insertion process. Tips 79 are dimensionally substantially smaller than the nominal diameter of passages 54. Each contact passage 54 has a conductive layer 84 plated, coated or positioned concentrically therein which is in-circuit with printed circuit 52.

As connector 50 is inserted within aperture 48 and the leading portions 78 of tangs 76 approach the composite resin backing 56, leading portions 78 register with contact passages 54. As the insertion process continues, leading portions 78 run up along the uppermost (as viewed in FIG. 6) opening of respective contact passages 54, causing tangs 76 to be squeezed towards one another slightly. When connector 50 assumes its final position, main contact portion 80 of each tang is generally axially aligned with the conductive layer 84 of its associated contact passage 54. Tangs 76 are relatively stiff in the axial direction but flexible radially whereby, in the installed position illustrated in FIG. 6, the pairs of tangs 76 are resiliently pressing outwardly against conductive layers 84 to ensure intimate contact therewith to provide a reliable electrical conductive path. As is best seen in FIG. 7, tangs 76 are generally rectangular in cross section where by in application, two edges are pressed into contact with conductive layer 84, constituting line contact therebetween. Because the contact area is relatively small, the unit loading along the line of contact will be relatively high.

In FIG. 6, connector 50 is illustrated as installed within aperture 48 in its nominal optimal position, that is, with main contact portions 80 of tangs 76 axially coinciding with conductive layers 84. The present design allows a substantial degree of mis-assembly wherein tangs 76 can be only partially inserted within contact passages 54 as illustrated in phantom 76' or over-inserted wherein tangs 76 extend substantially beyond contact passages 54 as illustrated in phantom at 76". In each case, the tangs 76 remain in intimate contact with contact 84 and thus in-circuit with printed circuit 52.

Figure 4:
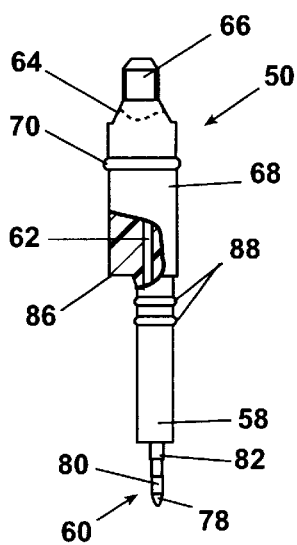
FIG. 4, is a side view of the electrical connector of FIG. 3 removed from the ABS unit.

Referring to FIG. 4, the body of connector housing 68 has a step 86 formed therein at a transition point between a region of relatively large diameter adjacent second end 64 and a region of reduced diameter adjacent first end 58. Upon complete assembly, step 86 will abut the uppermost surface of electronic control unit 46 at best illustrated in FIG. 3, to provide a locating reference for the axial positioning of connector 50 within aperture 48. Supplemental O-rings 88 are provided in grooves formed in the portion of connector 50 body closest to its first end 58 to ensure a redundant seal between connector 50 and the portion of aperture 48 formed by electronic control unit 46.

Figure 8:
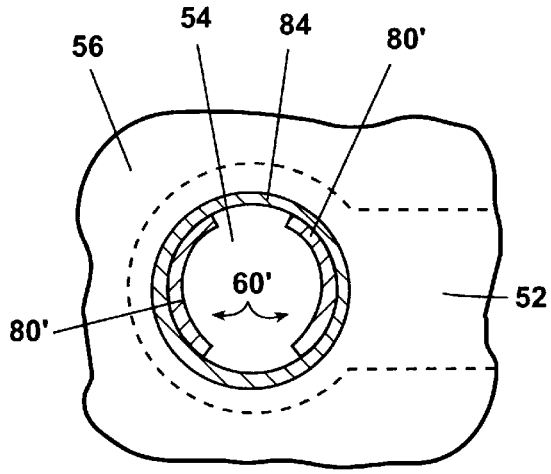
FIG. 8, is a cross-sectional view taken on lines VII—VII of FIG. 6, showing an alternative terminal configuration.

Referring to FIG. 8, an alternative embodiment of the invention is illustrated in which the main contact portion 80' of terminals obtains 60' are contoured whereby the outer surface thereof, in application, establishes a substantial area contact with portions of contact layers 84 within contact passages 54. The embodiment of FIG. 8, when contrasted with that of FIG. 7, is the same with the exception of the configuration of main contact tangs 80' wherein unit loading is reduced in exchange for contact surface area. Each approach has its own advantages as will be apparent to one of ordinary skill in the art.

Figure 5:
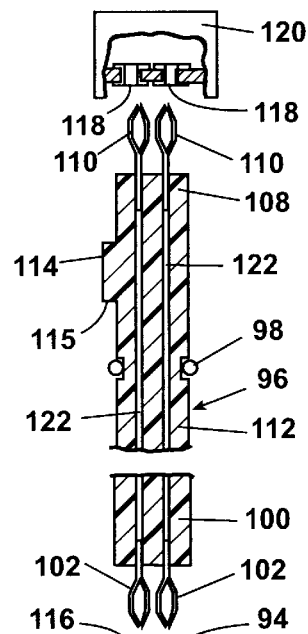
FIG. 5, is an exploded, broken view of a second embodiment of the present invention.
Figure 5:
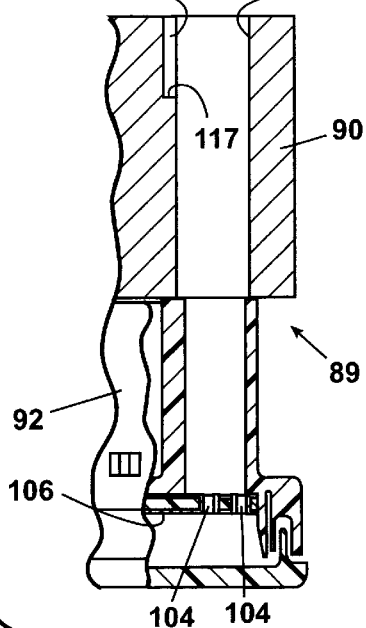

Referring to FIG. 5, a further alternative embodiment of the present invention is illustrated comprising an electronically controlled hydraulic unit 89 composed of a hydraulic control unit 90 and an electronic control unit 92 mounted in intimate contact with a aperture 94 extending therethrough. A connector 96 is constructed for slip-fit insertion within aperture 94. Connector 96 has a generally elongated cylindrical body with an O-ring 98 disposed within an annular groove generally midway along its axial length. Connector 96 has a first end 100 having a pair of flexible terminals 102 extend therefrom which, upon installation, extend through contact passages 104 associated with a printed circuit 106 within electronic control unit 92.

Connector 96 has a second end 108 with a pair of flexible terminals 110 extending upwardly therefrom. Terminals 102 and 110 are partially molded within and retained by connector housing 112. A radially extending key 114 is integrally formed on an outer peripheral surface of housing 112 which is matingly received within a guide slot 116 formed in hydraulic control unit 90 opening within aperture 94. When assembled, key 114 is disposed within guide slot 116 to ensure precise registration between terminals 102 and contact passages 104. The leading end 115 of key 114 abuts the radial end 117 of slot 116 to provide an axial stop for precise axial positioning of connector 96 within aperture 94.

Terminals 110 mate with contact passage ways 118 formed in a motor assembly 120, illustrated schematically in FIG. 5. Busses 122 are molded within connector housing 112 to provide a electrically conductive path between terminals 102 and terminals 110.

The connector of the present invention presents several advantages over known methods of transmitting power from a circuit to a pump in an ABS unit. Because the connector is removable, the electronic control unit portion of the ABS unit need not be fabricated with a permanently attached connector for the pump soldered to the circuit. With no permanent connector protruding from the electronic control unit, packaging space for shipping is minimized, as is the possibility for damage to the connector extension during shipping and handling. The electronic circuits of the electronic control unit are protected because a seal may be built into the generally cylindrical housing of connector of the present invention. Addition of a seal to the generally cylindrical housing of the connector also removes a molding and sealing step from the manufacture of the electronic control unit.

The present inventive connector is also not soldered to printed circuit of the electronic control unit, removing the possibility for poor electrical connection or failure of the electrical connection to the printed circuit due to environmental conditions or shock damage to the connector during shipping or installation. Serviceability of the electronic control unit is also enhanced through the use of a detachable or removable internal connector to the pump.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An assembly kit for an electronic control unit in an anti-lock braking system of the type having a pump separated from the electronic control unit by the interposition of a hydraulic control unit, comprising:

a printed circuit for providing power to the pump;

a housing that contains said printed circuit; and a detachable electrical connector for transmitting power from the printed circuit to the pump through an aperture in the hydraulic control unit, the detachable electrical connector having a generally cylindrical housing with first and second ends and having a length corresponding to the perpendicular distance between the printed circuit and the pump, said first end including at least one bifurcated flexible terminal mounted in the first end and electrically connected to said second end, said at least one bifurcated flexible terminal adapted to be detachably connected to said printed circuit and adapted to extend at least partially through a contact passage on said printed circuit and resiliently exert an outward force against the contact passage to establish an intimate electrical interconnection therewith, said second end adapted to be electrically connected to the pump, said cylindrical housing being sized relative to said aperture in the hydraulic control unit to provide a seal within said aperture to thus prevent said printed circuit from being environmentally exposed, and said cylindrical housing is provided with an O-ring to further improve said seal.

2. The assembly kit as in claim 1, wherein said second end includes at least one blade style terminal connector adapted for electrically connecting to the pump.

3. The assembly kit as in claim 1, wherein said second end includes at least one bifurcated flexible terminal mounted in said second end and electrically connected to said first end, said bifurcated flexible terminal adapted to be detachably connected to said printed circuit and adapted to extend at least partially through a contact passage on said pump to establish an electrical interconnection therewith.

4. The assembly kit as in claim 3, wherein associated bifurcated flexible terminals mounted in said first and second cylindrical housing ends are integrally interconnected by a conductive bus member insulatively extending through said cylindrical housing.

5. The assembly kit as in claim 1, wherein each bifurcated flexible terminal defines an outer surface configured to resiliently radially engage an electrically conductive portion of said contact passage.

6. The assembly kit as in claim 5, wherein each radially flexible, axially elongated bifurcated terminal comprises means to center itself with an associated contact passage.

7. The assembly kit as in claim 5, wherein the outer surface of said bifurcated flexible terminal is contoured to establish a region of substantial surface contact with said electrically conductive portion of said contact passage.

8. The assembly kit as in claim 5, wherein said bifurcated flexible terminal is axially elongated by a dimension substantially exceeding a characteristic axial dimension of said conductive portion of said contact passage.

9. The assembly kit as in claim 8, wherein said bifurcated flexible terminal is bifurcated into first and second generally parallel spaced segments, each segment resiliently bearing radially against said conductive portion of said contact passage.

10. The assembly kit as in claim 1, wherein said cylindrical housing includes at least one key protruding radially outward therefrom for aligning said cylindrical housing within said aperture.

11. An assembly kit for an electronic control unit in an anti-lock braking system of the type having a pump separated from the electronic control unit by the interposition of a hydraulic control unit, comprising:

a printed circuit for providing power to the pump;

a housing that contains said printed circuit; and a detachable electrical connector for transmitting power from the printed circuit to the pump through an aperture in the hydraulic control unit, the detachable electrical connector having a generally cylindrical housing with first and second ends and having a length generally corresponding to the perpendicular distance between the circuit and the pump, said first end including a first plurality of radially flexible, axially elongated bifurcated terminals mounted in said first end, wherein each of said radially flexible, axially elongated bifurcated terminals is integrally formed at one end of an elongated bus extending to said second end of the generally cylindrical housing, each of said first plurality of radially flexible, axially elongated bifurcated terminals adapted to be detachably connected to said printed circuit and adapted to extend at least partially through a corresponding contact passage defined by the circuit and resiliently exert an outward force against the corresponding contact passage to establish an intimate electrical interconnection therewith, and said second ends adapted to be electrically connected to the pump, said cylindrical housing being sized to provide a seal within said aperture in the hydraulic control unit between said first and said second ends of said cylindrical housing to thus prevent said printed circuit from being environmentally exposed.

12. The assembly kit as in claim 11, wherein said second end includes a second plurality of radially flexible, axially elongated bifurcated terminals mounted in said second end, wherein each of said second plurality of radially flexible, axially elongated bifurcated terminals mounted in said second end is integrally formed with another end of an associated bus, and each of said second plurality of radially flexible, axially elongated bifurcated terminals is adapted to be detachably connected to said printed circuit and adapted to extend at least partially through a corresponding contact passage defined by said pump to establish an electrical interconnection therewith.

13. The assembly kit as in claim 11, wherein said cylindrical housing includes at least one key protruding radially outward therefrom for aligning said corresponding radially flexible, axially elongated bifurcated terminals and contact passages.

14. The assembly kit as in claim 11, wherein said cylindrical housing is provided with an O-ring to further improve the seal between said first and said second ends of said cylindrical housing.

* * * * *